United States Patent [19]

Andersson

[11] Patent Number: 4,627,559

[45] Date of Patent: Dec. 9, 1986

[54] ROOF RACK FOR A VEHICLE

[75] Inventor: Sven R. Andersson, Sollebrunn, Sweden

[73] Assignee: Saab-Scania Aktiebolag, Sodertalje, Sweden

[21] Appl. No.: 622,249

[22] Filed: Jun. 19, 1984

[30] Foreign Application Priority Data

Jun. 20, 1983 [SE] Sweden ............................... 8303535

[51] Int. Cl.$^4$ .............................................. A45C 1/04
[52] U.S. Cl. ..................................... 224/329; 224/322
[58] Field of Search ............... 224/309, 320, 322, 326, 224/329, 314; 296/213

[56] References Cited

U.S. PATENT DOCUMENTS 3,385,488   5/1968   Bronson .............................. 224/320
4,410,211  10/1983   Kloppe et al. ...................... 224/329

FOREIGN PATENT DOCUMENTS 2551646   6/1977   Fed. Rep. of Germany .
2908682   9/1980   Fed. Rep. of Germany .
  60232  10/1954   France .
1489192   6/1967   France .

Primary Examiner—Stephen Marcus
Assistant Examiner—David Voorhees
Attorney, Agent, or Firm—Cushman, Darby & Cushman

[57] ABSTRACT

The invention relates to a roof rack section for attaching to a vehicle roof. Known such sections usually include a cross member having a foot attached to either end. Each such foot is provided with means for locking the section to the vehicle. Such known means often comprise screwed details which cause time-consuming and difficult fitting and removal of the roof rack sections. The present invention relates to a roof rack section including a crossbeam provided at either end with a foot which is formed with means for removably attaching the section to the body of a vehicle so that the section assumes a transverse extension above the vehicle roof. The invention is distinguished in that the means at each foot comprise at least two location pins, inwardly directed in the longitudinal direction of the crossbeam and adapted for accommodation in permanent recesses in the vehicle body when the roof rack section is fitted, and in that the section is provided with clamping means which by manual operation can cause the feet to assume different mutual spacing and thereby enable clamping the section to the vehicle body.

8 Claims, 5 Drawing Figures

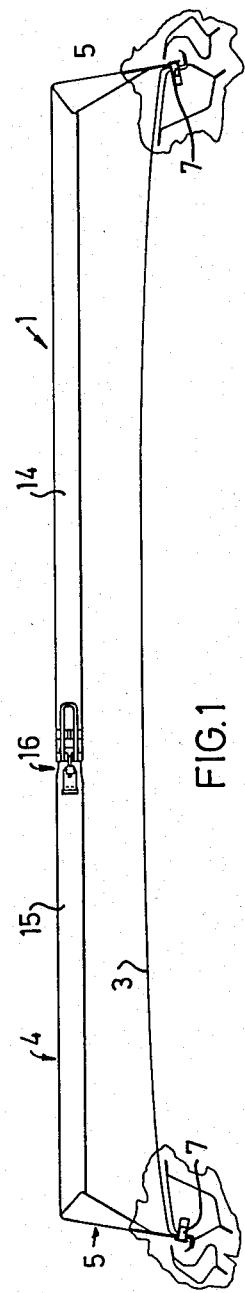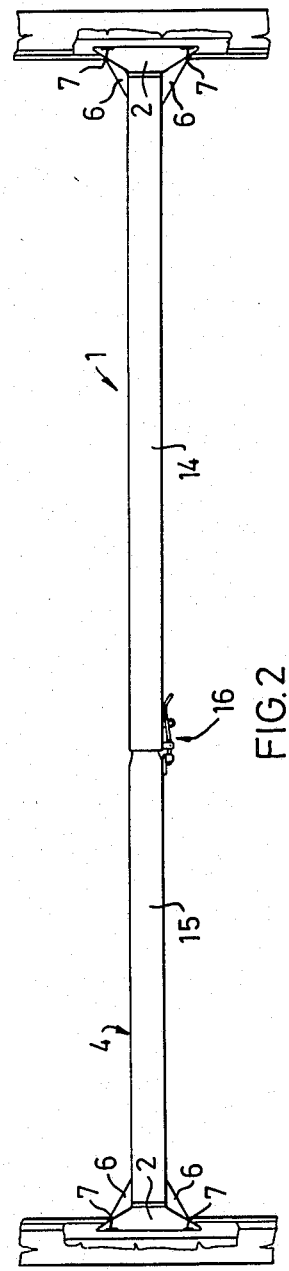

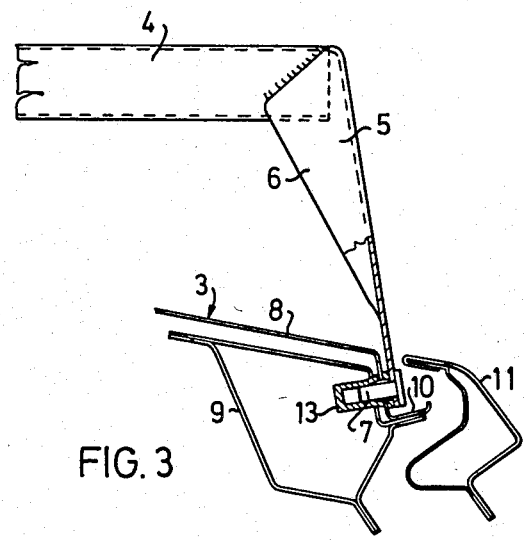
FIG. 3
FIG. 4B.
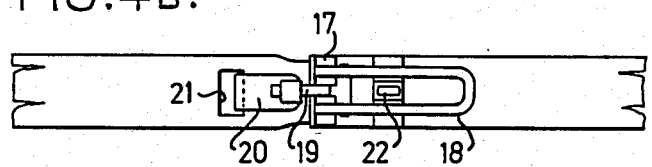
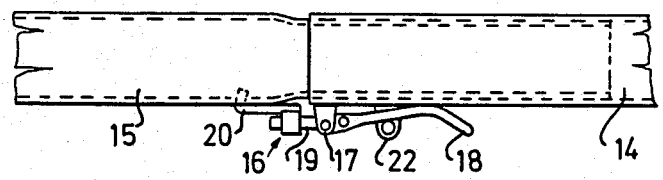
FIG. 4A.

ROOF RACK FOR A VEHICLE

The present invention relates to a roof rack section for a vehicle and comprises a crossbeam provided at either end with feet, the feet being provided with means for removably attaching the section to the body of a vehicle so that the section assumes a transverse position above the vehicle roof.

It is customary to utilize such roof rack sections of the kind in question on passenger cars because of their versatility. As a rule, the attachment of such a section to the vehicle body is performed with the aid of clamping screws or similar means by which each foot can be clamped to the vehicle drip moulding. Mounting of a roof rack section in this way thus requires tightening of a plurality of clamping screws with a given force, as well as sometimes requiring a special tool. This results in that fitting the roof rack sections can take a long time. As a result of these difficulties, it is usual to avoid dismantling the sections when they do not carry any load. However, due to the increase thus caused in air resistance, the vehicle fuel economy is adversely affected.

Unwillingness to dismantle conventional roof rack sections may also depend on the fact that the sections are usually implemented as crossbeams which are longer than the width of the vehicle. As a result, there are difficulties in having them accompany the vehicle in their dismantled condition. In addition, there is often the problem of storing conventional roof rack sections in a garage or in other storage space.

The present invention has the object of simplifying mounting and dismantling such roof rack sections and with this object in view, an inventively implemented roof rack section includes a crossbeam which is provided at its ends with feet formed with means for removably attaching the section to the body of a vehicle. The invention is substantially distinguished in that said means at each foot comprises at least two location pins directed inwardly in the longitudinal direction of the crossbeam, and adapted for accommodation in permanent recesses arranged in the vehicle body for this purpose when the roof rack section is fitted to the vehicle, and in that said section is provided with clamping means which can, by manual operation, cause the feet to assume different mutual spacing and thereby enable clamping the section to the vehicle body by the feet being caused to bear against the respective sides of the vehicle body, while the locating pins locate in the recesses in the vehicle body.

In a preferred embodiment of the invention there is solely required one clamping and locking means on the roof rack section, which simplifies and facilitates fitting and removal of the section. As a result of being able to fit them simply and rapidly, the sections can be used more often when they are needed, and of course be rapidly removed when they are not utilized. By forming the crossbeam so that, after removal, it can be separated into two halves, the section takes up a comparatively short length, which means that it can be easily stored in the vehicle or in the vehicle luggage compartment.

Further distinguishing features of the invention are apparent from the following description of an advantageous embodiment exemplifying the invention. The description is carried out with reference to the accompanying drawings, on which FIG. 1 is a front view of an inventive roof rack section, FIG. 2 is a view from above of the section according to FIG. 1, FIG. 3 is a front view to an enlarged scale of one end of the section according to FIG. 1, FIG. 4A is a plan view of a locking means, and FIG. 4B is a side view of the locking means of FIG. 4A.

FIG. 1 is a front view of a roof rack section 1 mounted on a vehicle roof 3. The roof 3 is however only at the ends of the section 1 illustrated in the form of cutaway cross sections. The section 1 includes a crossbeam 4 extending over the roof 3 in the transverse direction of the vehicle. Downwardly extending feet 5 are welded to either end of the crossbeam 4. Both feet 5 are symmetrically the same and the description is therefore limited to one of them.

Each foot 5 comprises an end plate 2 shaped like an isosceles triangle and two cheeks 6 which are welded onto one end of the crossbeam 4 and form a substantially symmetrical support means. There is thus obtained a strong and stiff connection between the foot 5 and the crossbeam 4. The lower part of the foot 5 is provided with two inwardly directed pins 7 which are suitably welded to the end plate 2 at a spacing which is greater than half the height of the end plate 2.

FIG. 3 illustrates how an inventively implemented foot 5 is intended to be fitted to the vehicle roof 3. In the exemplified embodiment, the vehicle roof 3 includes a roof sheet 8 welded to a stringer 9 extending in the longitudinal direction of the vehicle. The roof sheet 8 and the stringer 9 are formed with a longitudinal exterior drip moulding 10 which is substantially covered by the upper part of a closed vehicle door 11 which is partly illustrated in FIG. 3. Below the level of the door edge, a plurality of holes are provided in the sheet 8 and the stringer 9, flanged bushes 13 being pressed into the holes. The spacing of the holes corresponds to the spacing of the pins 7 on the foot 5, and each bush 13 is dimensioned for accommodating such a pin 7.

When the roof rack section 1 is fitted to a vehicle, the crossbeam 4 is intended to extend transverse the vehicle roof 3. For this purpose and for simplified fitting and removal, the crossbeam 4 is formed with two telescopically joined beam portions 14,15. According to an embodiment illustrated in FIGS. 1 and 2, the right-hand beam portion 14 is provided with a uniform cross section, while the left-hand portion 15 is formed with a reduced cross section at its free end portion such as to glide into the right-hand portion 14.

Both beam portions 14,15 are preferably made from square tubing, the left-hand portion 15 being adapted for fitting telescopically into the right-hand portion 14. Both portions have approximately the same length, whereby the middle region of the crossbeam 4 is given higher supporting strength.

When assembled, both portions 14,15 can be locked to each other in different relative positions with the aid of a locking means, suitably a toggle latch 16, arranged approximately at the middle of the crossbeam 4. The implementation of such a toggle latch 16 is illustrated in FIG. 4. A U-shaped lever 18 is pivotably mounted at its fulcrum in a mounting 17 welded to one portion 14. A tee-bolt 19 is pivotably mounted in the legs of the U-shaped lever 18, the end of the tee-bolt 19 being screwed into a nut on a tensioning plate 20 provided with a bent-over lip for engaging in a recess 21 in the other crossbeam portion 15. By the tee-bolt 19 being mounted in the lever 18 to give toggle action, and by screwing the nut onto the tee-bolt a suitable distance, the tensioning plate 20 can urge the crossbeam portions 14,15 into telescopic contraction when the lever 18 is swung towards the half 14, thus enabling the pins 7 on the feet 5 to engage in their bushes in the holes in the vehicle body. In such a clamped-on state of the section 1, the lever 18 engages a lug 22 which is rigidly attached to the crossbeam portion 14. The lug 22 is preferably shaped to enable a safety pin or an ordinary padlock to secure the section in a fitted position and to prevent unintentional release.

Fitting an inventive roof rack section 1 to the vehicle takes place in the following manner. The crossbeam portions 14,15 are fitted into each other without locking them together. The feet of the section 1 are then rested on the drip mouldings 10 on the vehicle body 2, the pins 7 on each foot 5 then being fitted into the bushes 13. The lip of the tensioning plate 20 is put into engagement with the recess 21, and the lever 18 is pushed towards the crossbeam half 14, the crossbeam portions 14,15 thus being pulled towards each other with their feet pressing against the respective sides of the vehicle body. The nut on the tensioning plate 20 is assumed to have been adjusted on the tee-bolt 19 so that the lever 18, when clamping, can assume a position substantially parallel to the crossbeam 4, as is shown in FIG. 4.

Within the scope of the following claims, the invention can be modified and implemented differently from what has been described in the foregoing example. The locking and tensioning means for the feet can thus be given another embodiment, enabling simple tensional clamping of the roof rack section. The crossbeam may, for example, be implemented such that one of its portions constitutes the chief length of the crossbeam, with its free end displaceably mounted in the free end of the shorter portion. The displaceable portion and its foot can then be clamped with the aid of a screwed joint or the like which extends in the longitudinal direction of the crossbeam and which is preferably located within the crossbeam. Guiding the displaceable portion relative the other portion can be achieved with the aid of sliding guides or the like.

The description above relates to one roof rack section and its attachment to a vehicle. In practice, it is however usual to use at least two such roof rack sections on one vehicle, thereby enabling the attachment of containers or the like for voluminous goods.

I claim:

1. Roof rack section for a vehicle, comprising a crossbeam provided at either end with a foot which is formed with mounting means for enabling mounting of the roof rack section above the vehicle roof in a transverse direction, characterized in that said mounting means at each foot comprises at least two fixed location pins which are directed inwardly in the longitudinal direction of the crossbeam, and adapted for accommodation in permanent recesses in the vehicle body intended for this purpose when the roof rack section is fitted to the vehicle, and in that said roof rack section is provided with clamping means which can, by manual operation, cause the feet to assume different mutual spacing and thereby enable clamping the section to the vehicle body by the feet being caused to bear against the respective sides of the vehicle body, while the locating pins locate in the recesses in the vehicle body.

2. A section as claimed in claim 1, characterized in that the crossbeam is formed from square tubing.

3. A section as claimed in claim 2, characterized in that the crossbeam comprises two beam portions, telescopically connected to each other.

4. A section as claimed in claims 1 or 3, characterized in that each foot comprises an end plate substantially configured as an isosceles triangle, and two cheeks welded to the end plate.

5. A section as claimed in claim 4, characterized in that a foot is attached to the outer end of each of the crossbeam portions.

6. A section as claimed in claim 5, characterized in that two inwardly directed location pins at a spacing greater than half the height of the foot are attached to the lower free portion of each foot.

7. A section as claimed in claim 1 or 6, characterized in that the clamping means comprises a toggle latch including a lever pivotably mounted at one crossbeam portion and a hooked tensioning member which is articulatedly connected to the lever and intended to engage with its hook in a recess formed for this purpose in the other crossbeam portion when the section is fitted.

8. A section as claimed in claim 7, characterized in that the tensioning member is connected to the lever via an adjustable screw connection.

* * * * *